United States Patent [19]
Bertocchi

[11] Patent Number: 4,643,085
[45] Date of Patent: Feb. 17, 1987

[54] ROTARY MACHINE FOR EXTRACTION OF JUICE AND PUREE FROM TOMATOES, FRUIT AND OTHER PRODUCE

[76] Inventor: Primo Bertocchi, No. 8 Via Argonne, Parma, Italy

[21] Appl. No.: 716,321

[22] Filed: Mar. 26, 1985

[30] Foreign Application Priority Data

Apr. 6, 1984 [IT] Italy ................................ 3414 A/84

[51] Int. Cl.⁴ .............................................. A23N 1/02
[52] U.S. Cl. .................................... 99/510; 99/513; 241/260
[58] Field of Search ................ 99/495, 509–513; 100/110, 116; 241/246, 260; 366/262, 266, 279, 325, 326, 328, 64, 99

[56] References Cited

U.S. PATENT DOCUMENTS

| | | | |
|---|---|---|---|
| 2,513,974 | 7/1950 | Thomas | 99/513 X |
| 2,558,799 | 7/1951 | Thomas | 99/510 |
| 2,864,419 | 12/1958 | Woock | 99/513 |
| 3,976,001 | 8/1976 | Trovinger | 99/513 |

Primary Examiner—Timothy F. Simone
Attorney, Agent, or Firm—Laff, Whitesel, Conte & Saret

[57] ABSTRACT

The invention relates to a machine for the extraction of juice and puree from tomatoes, fruit and other produce having certain essential features, namely: a rotor with specially shaped vanes arranged in such a way as to invest the bulk of produce with a turbulence which speeds and enhances the process of extraction, as well as improving a high percentage yield per unit of bulk foodstuff; an inflow device having one fixed and one rotary component which guarantees a uniform break and a steady, even flow of broken produce to each rotor vane; a collection chamber separated into two or more distinct stages each with a relative outlet; a strainer having perforations to suit the individual extraction stages of the machine; and means for the removal of foodstuff which accumulates on the outer surface of the strainer featuring utilization of a part of the extracted juice recycled under pressure.

9 Claims, 16 Drawing Figures

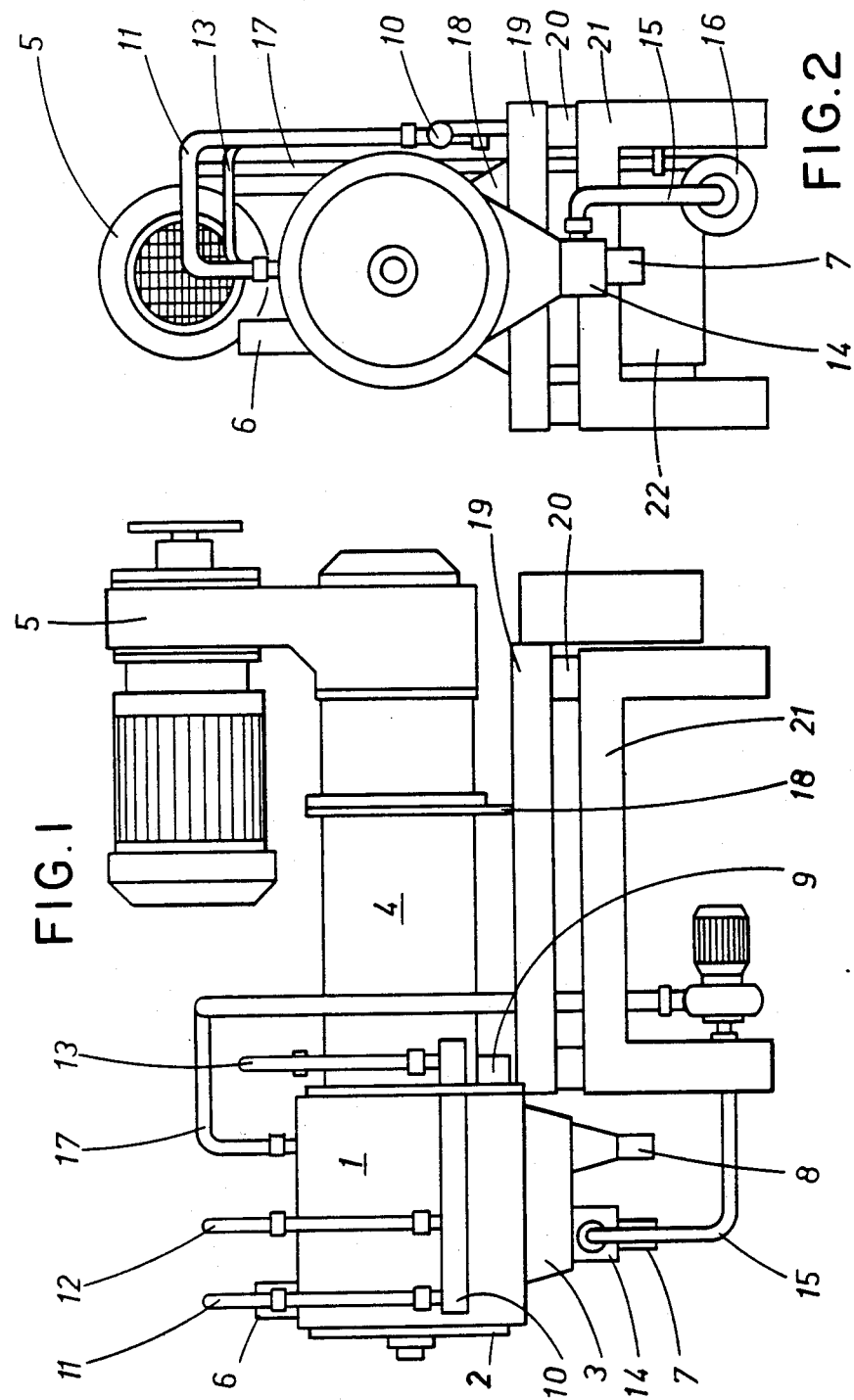

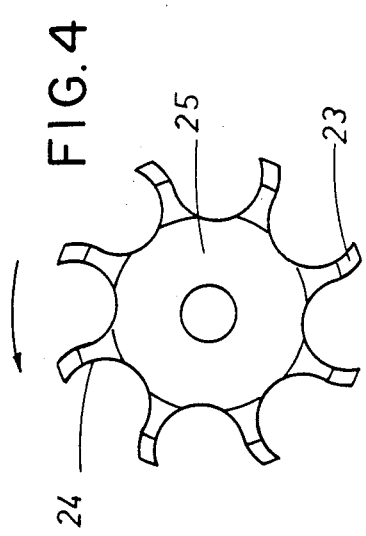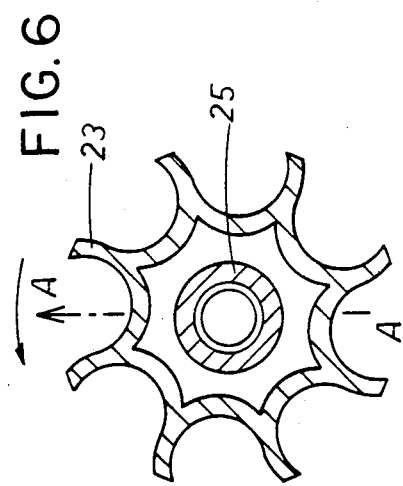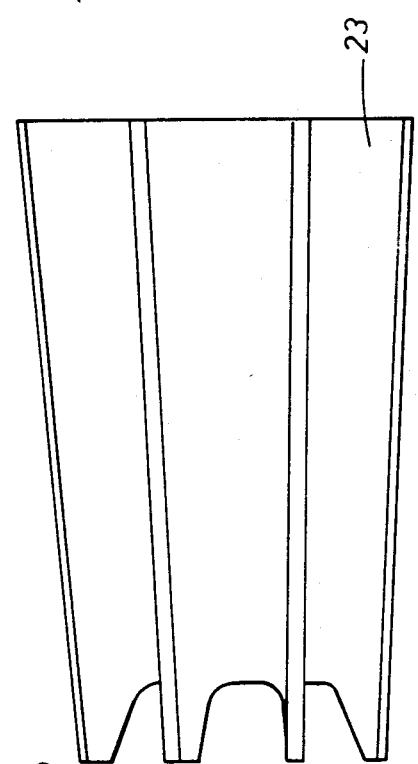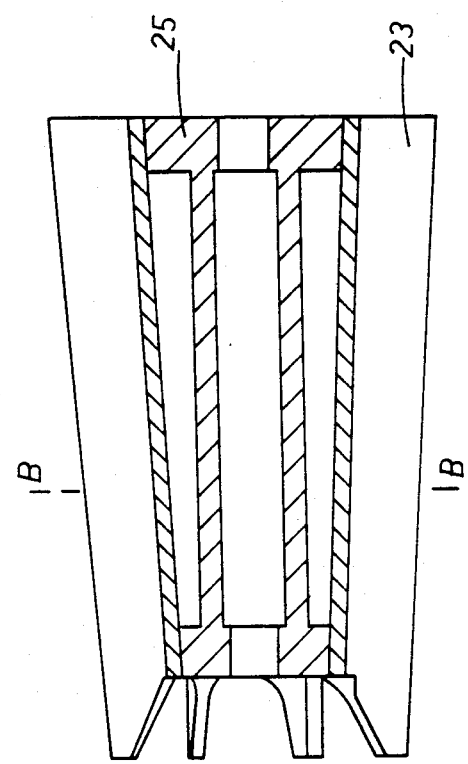

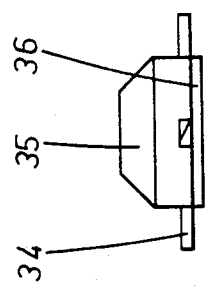
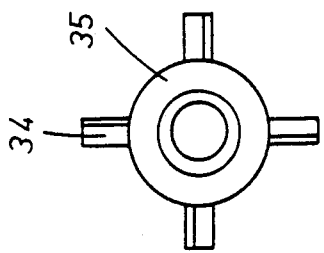
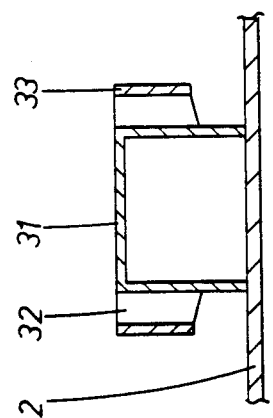
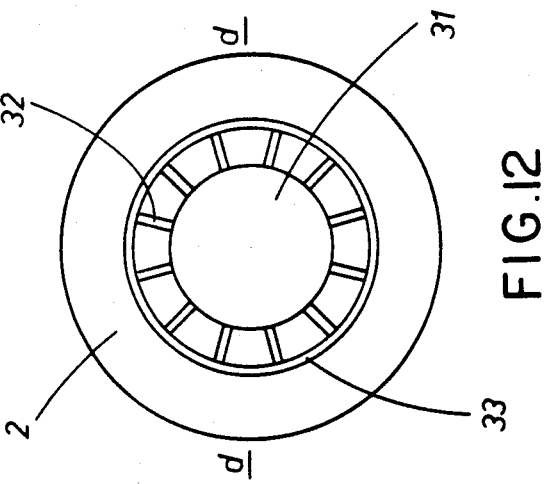
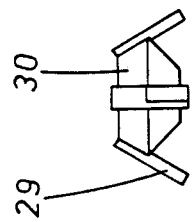
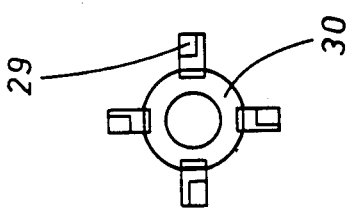
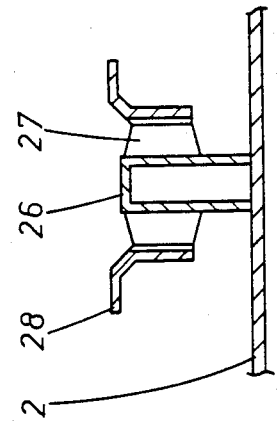
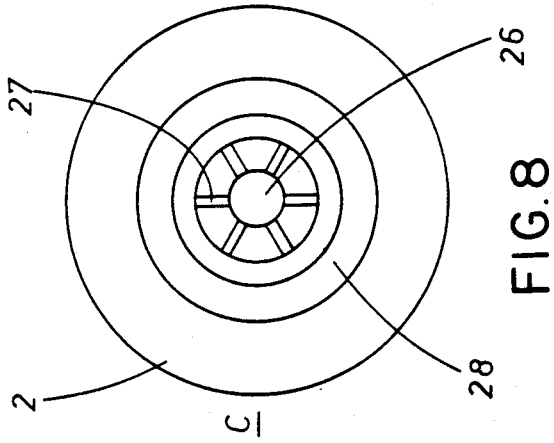

ROTARY MACHINE FOR EXTRACTION OF JUICE AND PUREE FROM TOMATOES, FRUIT AND OTHER PRODUCE

BACKGROUND OF THE INVENTION

The invention relates to a rotary machine for the extraction of juice and puree from tomatoes, fruit and other produce, consisting substantially of a cylindrical body closed off at both ends, the underside of which gives out into a hopper for collection of the juice and puree extracted, a perforated and suitably strengthened cylindrical or conical strainer inside of which a vaned rotor separates juice and puree from other waste matter causing the former to pass through the strainer, and expelling the latter via a discharge outlet. The body of the machine is attached to one end of a structure to which the shaft carrying the vaned rotor is journalled; the remaining end of the structure accommodates a drive system which transmits power to the rotor shaft, thereby providing the necessary rotation.

There are a great many machines currently in use which, notwithstanding minor differences from one to the next, are designed and built to operate substantially in the manner described above. All such machines embody the basic concepts of construction and operation as defined by the prior art in this field -viz, without exception, rotors utilized in machines according to the prior art feature vanes which displace broken produce either tangentially to the cylindrical strainer (i.e., the single vane being perpendicular to a plane lying tangential to the strainer at the tip of the vane) or obliquely thereto (rotors wherein the working surface of the vane forms an acute angle with a plane lying tangential to the strainer at the tip of the vane). In either case, the force to which produce is subject during rotation is such as to trap the produce in that angle where the vane meets the strainer, causing it to clog statically on the rotor vane through lack of the requisite turbulence. Clogging such as this works to the detriment of the process of extraction and is a minus factor as regards efficiency of the system;

rotors in the prior art machines are supplied with produce in arbitrary fashion, with no provision being made to guarantee either the regular size of fragments making up the bulk, or the even and steady distribution thereof along all of the rotor vanes, thereby detracting further from the efficiency of the rotor;

the enclosure created between the hopper casing and the bottom part of the strainer is a single enclosure, also, the strainer perforations are of a single gage, factors which oblige mingling of the end-product in its entirety and limit the machine's capacity to extract juice/puree of different quality and composition from the same bulk;

the greater the percentage rise in yield of end-product from bulk, the greater the accumulation of foodstuff on the outer surface of the strainer, especially nearest the waste discharge outlet. Such accumulations must be cleaned off periodically, provision for which is made in prior art machines by water jet. This method of cleaning is beset by serious drawbacks: if carried out with the machine still running, it will add water to the endproduct; if carried out with the machine at standstill, it involves downtime. In processes featuring ultra high yield extraction; the rapid accumulation of strained matter on the outer surface of the strainer is such as to outlaw cleaning by water jet altogether.

From the foregoing, it will be seen that machines according to the prior art exhibit numerous shortcomings and drawbacks, at least, where their interdependent components are concerned. The invention described herein sets out to eliminate such shortcomings and drawbacks.

SUMMARY OF THE INVENTION

The rotor is without doubt the most important single component of the machine, since the performance and efficiency of the entire system depend ultimately on the features of its operation. The design of the rotor according to the invention features vanes embodied such as to invest the bulk of produce with a turbulence which radically alters the process of extraction, inasmuch as the outermost section of the working surface of the vane is raked in such a way as to form an obtuse angle somewhat greater than 90° with a plane lying tangential to the cylindrical strainer at the tip of the vane. Instead of pressing produce directly against the strainer, vanes thus embodied will draw produce away from the strainer. More precisely, force imparted by the vane to the produce in a perpendicular direction from all points of the working surface, sub-divides into two basic components of which one, operating tangentially to the cylindrical strainer, is the force which overcomes resistance of the bulk to motion; the other, perpendicular thereto, being centripetal force which impels produce toward the axis of rotation of the rotor, and likewise sub-divides into two components, one perpendicular to the vane, the other parallel thereto. The usefulness of the force which acts parallel to the vane is that of causing the produce to flow along the working surface, setting up a relative motion between produce and vane which increases rapidly in intensity with the increase in angular velocity of the rotor and develops ultimately into a permanent state of energy-invested turbulence.

This action, together with the other important features of interplay between components, is such as to produce a rapid and continual recycling of the stratum of produce in contact with the strainer, and will be enhanced still further if the vane itself is curved in such a way that intersection of the working surface of the vane by a cross-sectional plane perpendicular to the axis of rotation, describes an arcuate, elliptical, or similar quasi-circular profile. Thus, the set of vanes seen in section around the hub of the rotor will exhibit the profile of an endless chain of scooped recesses. The turbulence set up in these scooped recesses is of signal effectiveness, the time necessary for extraction is cut considerably, and the percentage yield of juice or puree per unit of bulk produce will be the maximum obtainable from any given type of tomato or fruit.

The trajectory of a particle of the produce may be likened to a hypocycloid rolling in a helix, the distance covered by which, per unit of time and in the same surrounding conditions, is considerably greater than that allowed by any other of the prior art methods; this permits of a marked reduction in the surface area of the strainer, as well as in the dimensions, weight and power consumption of the machine as a whole.

With regard to the determining influence on rotor efficiency of the fineness or coarseness of the break, and of the regularity of flow of broken produce onto the rotor vanes, the invention seeks to ensure optimum conditioning of these factors by location between the inlet and the rotor of a device comprising two parts: a fixed spout, the function of which is to channel the inflow of produce into a continuous stream whose directional and dimensional characteristics are thus controlled; and a rotary deflector consisting of a hub encircled by a set of blades equal in number to the vanes of the rotor, the function of which is to scatter the produce exiting from the fixed spout, breaking up the larger fragments, and splitting the single stream into a proportionate number of smaller streams to be directed uniformly and continuously onto the vanes of the rotor.

Another important feature of the invention which is highlighted by the entity and continuity of variation in characteristics of the extracted product which may be brought about with the rotor described between the start and finish of the process, across a wide range of flow rates, is that of the partitioning of the collection chamber (that is, the space existing between the hopper and the bottom of the strainer) into two or more totally independent stages provided with relative outlet pipes. Each stage can be utilized to collect a portion of the end-product according to quality and composition, since in processing of the type in question it can be more advantageous to split the end-product and channel the different grades into separate successive processes to obtain best possible results.

The characteristics of such separated grades of the end-product, corresponding in number to the number of collection stages, can be further modified by altering the diameter and the number per unit area of holes in the relevant stage of the single strainer, or indeed by fitting each stage with its own purpose-designed strainer.

It is an object of the invention, furthermore, to solve the problem of foodstuff which accumulates on the outer surface of the strainer, a problem intensified by dint of the ultra high yield extraction obtainable with the rotor and inflow spout/deflector assembly which the invention proposes. In order to achieve this object, a distinction is drawn between two types of operation: first, that of the machine's general cleaning, which is accomplished manually, utilizing water with the machine at standstill, and carried out every ten hours or thereabouts; secondly, that of removing the accumulations of foodstuff from the strainer, which is accomplished automatically, utilizing a proportion of the extracted juice with the machine in operation, and brought about several times per hour.

In implementing the strainer cleaning cycle, the invention incorporates automatic means consisting of an intake pipeline, a pump, a pressure line, a battery of jets, and a timer. A quantity of juice is extracted at regular intervals programmed by the timer, to which the pump is interlocked, and jetted under pressure at the accumulated foodstuff which, loosened and rendered fluid by the copious flow of liquid, dissolves and flows out via the discharge.

A number of important advantages are offered by the invention, namely:

the percentage of juice and puree extracted from produce is the highest obtainable per given variety of tomato or fruit, and is easily regulated by modifying the speed of rotation, hence the degree of turbulence;

foreign matter (stalks, for instance) which if crushed or pulverized would mingle, and detract from the quality of the end-product, remains substantially intact due to the speed of the process and of the noticeable absence of compression between vanes and strainer (the strainer itself also being less subject to distortion and wear);

the surface area of the strainer can be notably reduced, permitting similar reductions in the machine dimensions, weight, and power consumption;

a more uniform break of the produce is instrumental in preventing discharge of waste with a higher or lower moisture content from vane to vane, thereby contributing to better percentage yield overall;

the absence of noticeable fluctuation or interruption in the flow of broken produce to the rotor vanes signifies better distribution of the mechanical load, and a more balanced and efficient operation of the rotor;

the facility of separating the end-product into distinct grades of extraction permits of diversifying ultimate utilization according to quality and composition;

the composition of a single extraction grade is variable at will by altering the diameter, and number per unit area, of holes in the relative stage of the strainer;

in the event of post-extraction operations becoming necessary in order to correct or improve one or more of the single grades, these can be suitably treated while the remainder of the end-product proceeds direct to the batching operation, or whatever;

the grade of extraction can be potentialized to maximum levels in view of the fact that the problem of highly-viscous foodstuff accumulating on and causing blockage of the strainer is overcome; overcome, moreover, without addition of water to the product, and with no difficulty whatever from the operational standpoint.

BRIEF DESCRIPTION OF THE DRAWINGS

Additional features and advantages of the invention will emerge from the detailed description which now follows, when read in conjunction with the accompanying drawings, in which:

FIG. 1- is a side view of the machine seen in vertical elevation;

FIG. 2- is an end view of the machine in FIG. 1;

FIG. 3- is the side view of a conical rotor according to the invention, embodied with 8 vanes;

FIG. 4- is an end view of the rotor in FIG. 3;

FIG. 5- is a longitudinal section through the rotor shown in FIG. 3, taken through A—A in FIG. 6;

FIG. 6- is the cross section through B—B in FIG. 5;

FIG. 7- is the section through a first embodiment of the fixed spout, taken through C—C in FIG. 8;

FIG. 8- is a frontal view of FIG. 7;

FIG. 9- is the side view of a first embodiment of the rotary deflector;

FIG. 10 is a frontal view of FIG. 9;

FIG. 11 is the section through a second embodiment of the fixed spout, taken through d—d in FIG. 12;

FIG. 12 is a frontal view of FIG. 11;

FIG. 13 is the side view of a second embodiment of the rotary deflector;

FIG. 14 is a frontal view of FIG. 13;

DESCRIPTION OF THE PREFERRED EMBODIMENTS

Figure 16:
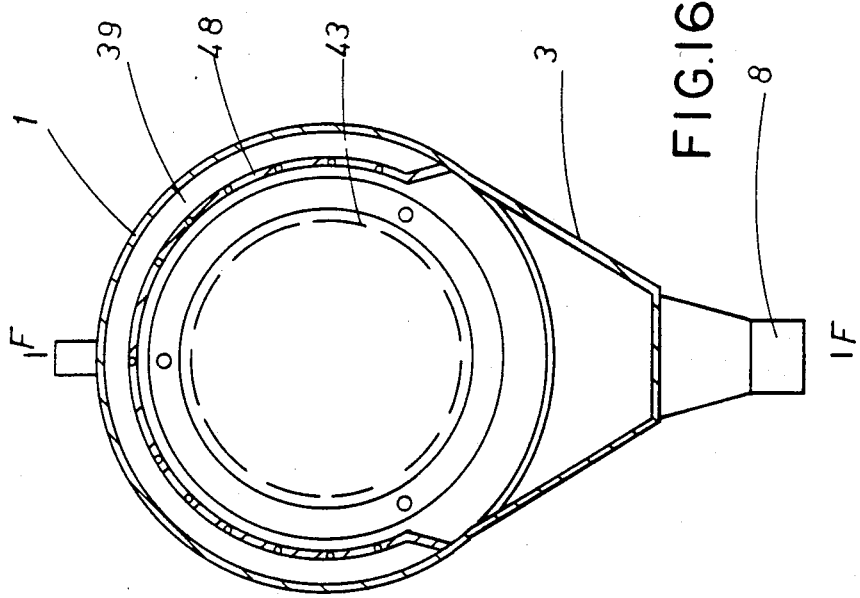
FIG. 16 is a cross section taken through E—E in FIG. 15.

With referenc to the drawings, 1 denotes the main cylindrical body of the machine which is enclosed at the front end by a cover 2, connected via its underside with a hopper 3, and integral at its remaining end with a support 4, at the opposite end of which the machine's drive system 5 is mounted.

6 denotes the pipe via which produce is fed into the machine. A first outlet 7 discharges juice from the first stage of the machine, whilst a second outlet 8 discharges juice and puree from the second stage; waste matter exits by way of the outlet denoted 9. Hot water under pressure is supplied to a manifold 10 and thence through pipes 11, 12 and 13 for the purposes of cleaning the machine when at standstill. The automatic means for removing and dissolving foodstuff which accumulates on the strainer comprise a supply bowl 14 (seen in section in FIG. 15), an intake line 15, a motor-driven pump 16, and a pressure line 17.

The weight of the machine is taken by cradles 18 integral with a frame 19 which is positioned by way of anti-vibration mounts 20 on a main bearing structure 21 which also carries a switch panel 22 housing electrical control and safety devices.

The rotor, as illustrated in FIG. 3, is conical in embodiment, and has eight vanes 23 issuing from the hub, the outermost edge of each vane lying within a relative plane common to the rotor axis in each case. The ends of the vanes which project toward the inlet are provided with cutting edges 24 disposed in a conical formation so as to provide a deflector (seen frontally in FIG. 4).

The hub of the rotor, denoted 25 and illustrated by the cross-hatched lines in FIG. 5, is provided with a hole at each each end through which the drive shaft is inserted.

The profile of the rotor vanes will be seen to best effect in FIG. 6, which indicates both the direction of rotation and the angle of the vane's working surface, or more precisely, of the relative tangent, at any given point nearest the outermost edge. FIG. 6 also gives a clear illustration of the scooped recess between each two adjacent vanes, which in the rotor disclosed is of simple enough shape, since the vanes are arcuate to a circle.

In the embodiment illustrated, use is made of an fixed spout (FIGS. 7 & 8) embodied integrally with the end cover 2 of the machine and incorporating a hub 26, radial fins 27 and a diffuser 28. This spout is designed to pair with a conical type deflector, and may operate either with the integral rotor-deflector of FIGS. 3 and 4 or with a separate deflector as shown in FIGS. 9 and 10, which is provided with blades 29 screwed or bolted to a central hub 30.

A second embodiment of the fixed spout, likewise integral with the end cover 2 of the machine, and shown in FIGS. 11 and 12, is designed to pair with a flat type deflector -that is, with the cutting edges of the blades rotating within a common plane. This spout incorporates a hub 31, radial fins 32, and a cylindrical diffuser 33, and in practice would be paired with a deflector such as that in FIGS. 13 & 14, having blades 34 which locate in sockets offered by a hub 35 and, held in position thus by a detent or pin, are clamped by a disk 36 which is screwed or bolted to the hub. Such a spout could pair equally well with a flat deflector of the type embodied integrally with the rotor, the vane ends of which being suitably machined so as to radiate within the one common plane, and duly sharpened.

Figure 15:
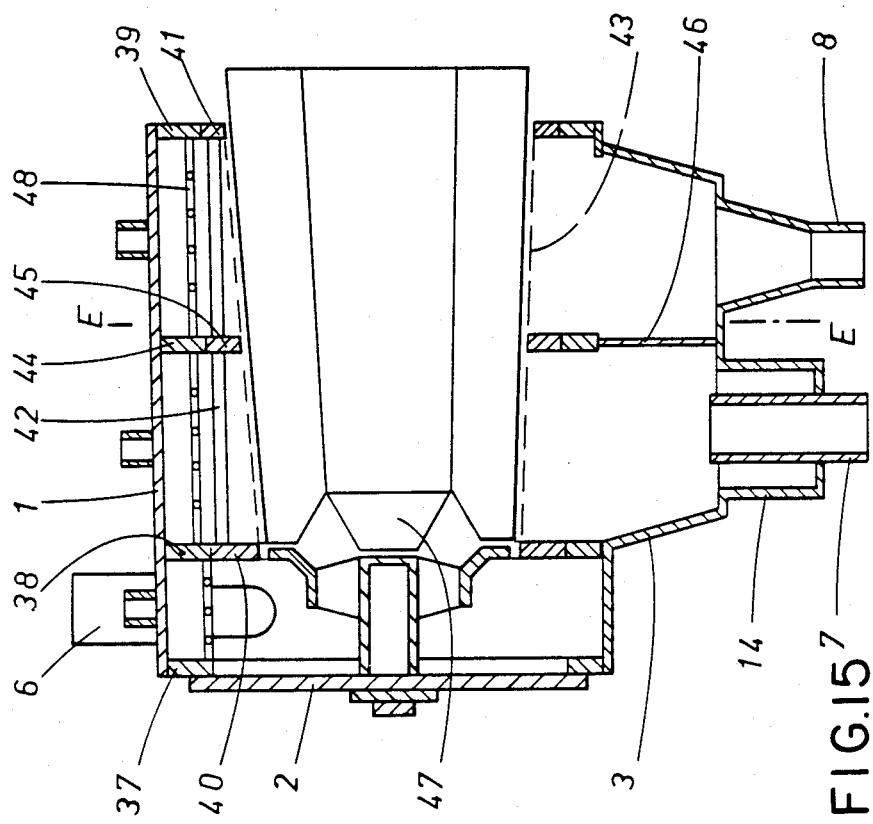
FIG. 15 is a longitudinal section through the cylindrical body of the machine and its principal components, taken through F—F in FIG. 16.

It will be observed that the parts illustrated in FIGS. 9, 10, 11, 12, 13 & 14 could not be incorporated into a machine as illustrated in FIGS. 15 & 16, which is embodied with the spout of FIGS. 7 & 8 and the integral rotor-deflector of FIGS. 3 & 4. The alternative embodiment of such parts is of significance however: whereas a conical or cylindrical pairing of spout and deflector is preferable for produce of a low consistency, a flat type of spout has the advantage of being universal (suitable for different designs of rotor) though power consumption increases with the flat type.

As the figures illustrate, the assembly of spout and deflector can either consist of independent parts, located between the inlet and the rotor, or be embodied integrally with existing parts of the machine. The fixed spout can be incorporated with the end cover 2 or with the body 1, whilst the deflector can be built into the rotor, to great advantage. The integral type of embodiment illustrated in FIGS. 3, 4, 7, 8, 11 & 12 is to be preferred for simplicity of construction, and economy.

The outer casing of the body 1 of the machine is integral with the hopper 3 below (see FIGS. 15 and 16), and is welded to flanges 37, 38 and 39 which impart strength to the assembly, and at the same time serve to align a cage formed by further flanges 40 and 41 and struts 42 which carries the perforated metal strainer 43. The endcover 2 is bolted to the outermost flange 37, and the spout of FIGS. 7 & 8 is welded direct to the cover. The flange 39 at the remaining end of the body is provided with threaded holes to enable bolting to the support 4.

The flange denoted 44, the cage center flange 45, and the web 46 dividing the hopper, together perform the sole function of separating the collection chamber into two distinct stages into which juice and puree will drop from respective stages of the strainer (the dissimilar perforations of which are indicated by the broken lines in FIG. 15) without mingling. The two grades of extracted end-product thus obtained are drawn off via separate outlets 7 and 8.

FIG. 15 shows the rotor locked in position on the drive shaft by its hub 47, and gives a clear picture of the passage of produce into the machine. Descending by way of the tangential inlet 6, a certain rotary motion is set up naturally in the bulk, which fills the entire space enclosed by the end cover, the diffuser and the outer casing, and flows out through the annular passage between the hub 26 and diffuser 28 of the fixed spout in a hollow cylindrical stream, which is enlarged by the hub 47 in such a way as to hit the blades of the rotary deflector.

The division of the machine into stages is also instrumental in facilitating removal of the foodstuff which accumulates on the outer surface of the strainer. Since the operational characteristics of the rotor are such as to ensure a smooth, progressive build-up of viscosity in the produce as extraction proceeds, even where marked variations in the flow are brought about, that point on the strainer where accumulation commences is easily identifiable; thus, 'engineering' the process in such a way that the point in question falls within the second stage, one avoids appreciable accumulation of extracted foodstuff on the outer surface of the strainer within the first stage. In this way it becomes possible to utilize juice extracted in the first stage to dilute and remove puree accumulating in the second.

The means by which the aforementioned procedure is brought about will be seen in FIG. 1 -viz, an intake line 15, a pump 16 driven by electric motor interlocked with an adjustable timer, and a pressure line 17. Juice is drawn from a supply bowl 14, which has priority into the intake line 15 over the main outlet 7, and directed at the strainer via a perforated baffle 48 (see FIG. 16) under pressure. The baffle creates a jacket with the outer casing of the body 1, which the pressurized juice fills before being ejected at high speed via the holes of the baffle itself, which are sufficient in numCber to produce jets which will ensure wash-down of the entire surface area affected.

What is claimed:

1. A rotary juice and puree extraction machine for extracting juice and puree from tomatoes, fruit and other produce, having a cylindrical body with an underside which feeds into a hopper for collecting the juice and puree, said hopper being separated into at least two stages with each stage having a separate outlet, a perforated strainer positioned between the body and the hopper, a cylindrical vaned rotor positioned in said housing and acting with said strainer to separate juice and puree from waste matter causing the juice and puree to pass through the strainer into the selected stages of the hopper; said rotor being provided with a plurality of vanes extending substantially the length of the rotor, each vane having a working surface which is raked forward in the direction of rotation at the outer edge nearest the strainer and forming an obtuse angle with a plane lying tangential to the strainer at the tip of each vane.

2. The machine of claim I wherein each vane is curved in a direction of rotation and a cross-sectional plane perpendicular to the axis of rotation describes an arcuate, elliprical, or similar quasi-circular profile substantially free from bends or sharp variations in curvature, such that the set of vanes, see in section around a hub of the rotor, will exhibit a profile of an endless chain of scooped recesses in which high levels of turbulence may be generated.

3. The machine of claim 1 comprising means to remove accumulated foodstuff from the outer surface of the strainer by recirculating a portion of the extracted juice as a washing medium, through an intake pipeline connected a pump, which is connected to a pressure pipeline that is directed at the strainer in a battery of jets at regular intervals programmed by a timer connected to an electric motor driving the pump; said jets being sufficient in number to ensure that the accumulated foodstuff is loosened and rendered fluid and sent to a discharge.

4. The machine of claim 1, comprising a feed means having a fixed spout, a diffuser within the spout to channel the inflow of produce into a continuous stream with controlled directional and dimensional characteristics; a rotary deflector having a hub (30 or 35) encircled by a set of blades equal in number of rotor vanes to scatter the produce exiting from the fixed spout and to split up said stream into a number of smaller streams to be directed uniformly and continuously onto the rotor vanes.

5. The machine of claim 4 wherein said deflector is connected to the rotor and the rotor vanes have a feed and which shaped into blades to provide the deflector.

6. The machine of claim 1, comprising a feed means having a fixed spout, a diffuser within the spout to channel the inflow of produce into a continuous stream with controlled directional and dimensional characteristics; a rotary deflector having a hub (30 or 35) encircled by a set of blades equal in number of rotor vanes to scatter the produce exiting from the fixed spout and to split up said stream into a number of smaller streams to be directed uniformly and continuously onto the rotor vanes.

7. The machine of claim 1 the stages of the hopper are provided, by concentric flanges and at least one web integral with the hopper to provide a substantially fluid-tight barrier to provide preselected stages of the extraction process to obtain end products of different quality and composition from the same initial bulk of produce.

8. The machine of claim 7 wherein said strainer has for each stage of the extraction process a preselected diameter and number per unit area of strainer holes to vary the qualititive and compositional characteristics of each extraction stages; and wherein the dissimilar perforations are either incorporated into one composite strainer or a number of separate interconnected strainers.

9. The machine of claim 1 the stages of the hopper are provided, by concentric flanges and at least one web integral with the hopper to provide a substantially fluid-tight barrier to provide preselected stages of the extraction process to obtain end products of different quality and composition from the same initial bulk of produce.

* * * * *